Jan. 21, 1930.　　L. A. CARTER　　1,744,362
MILLING MACHINE
Filed March 21, 1928　　7 Sheets-Sheet 7
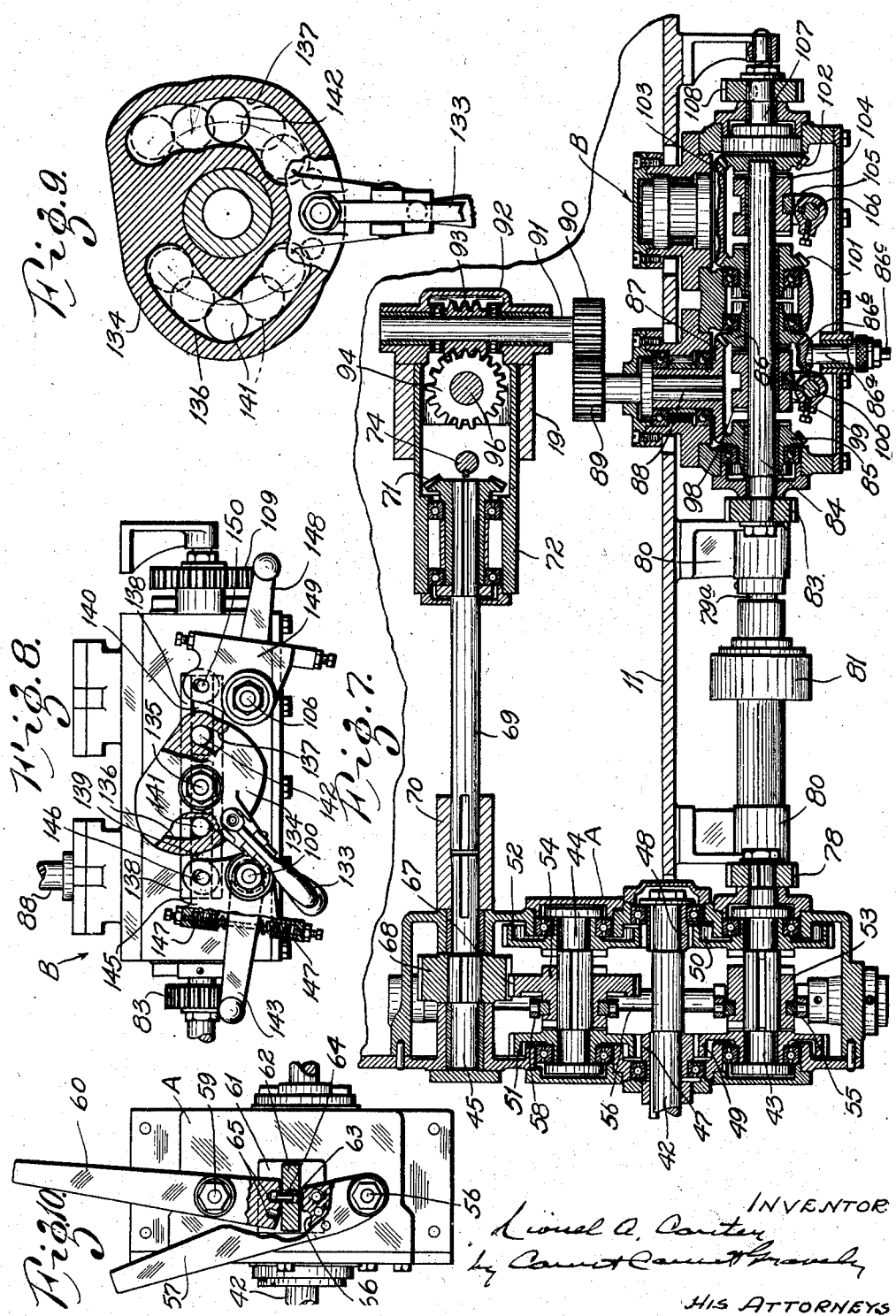

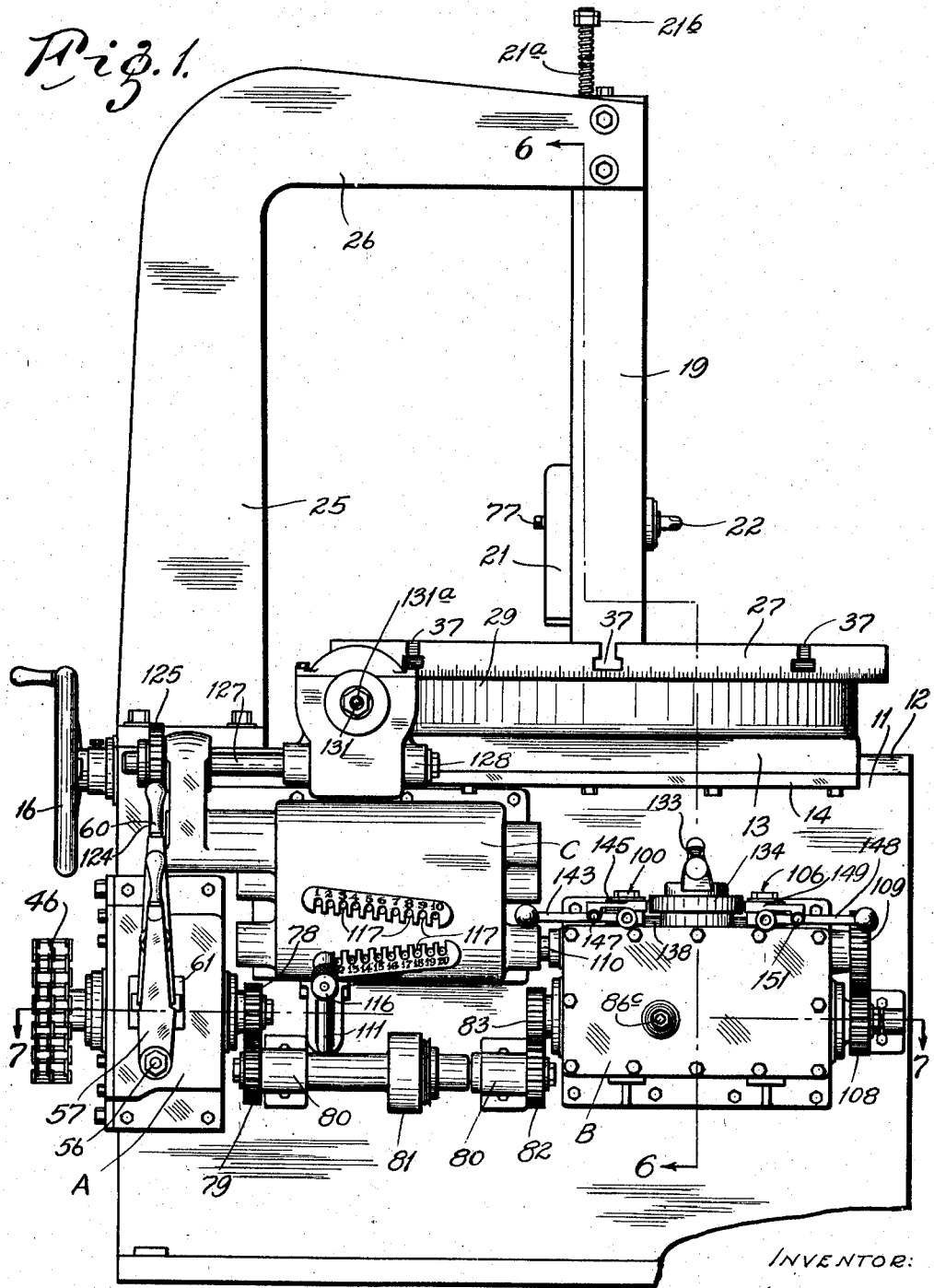

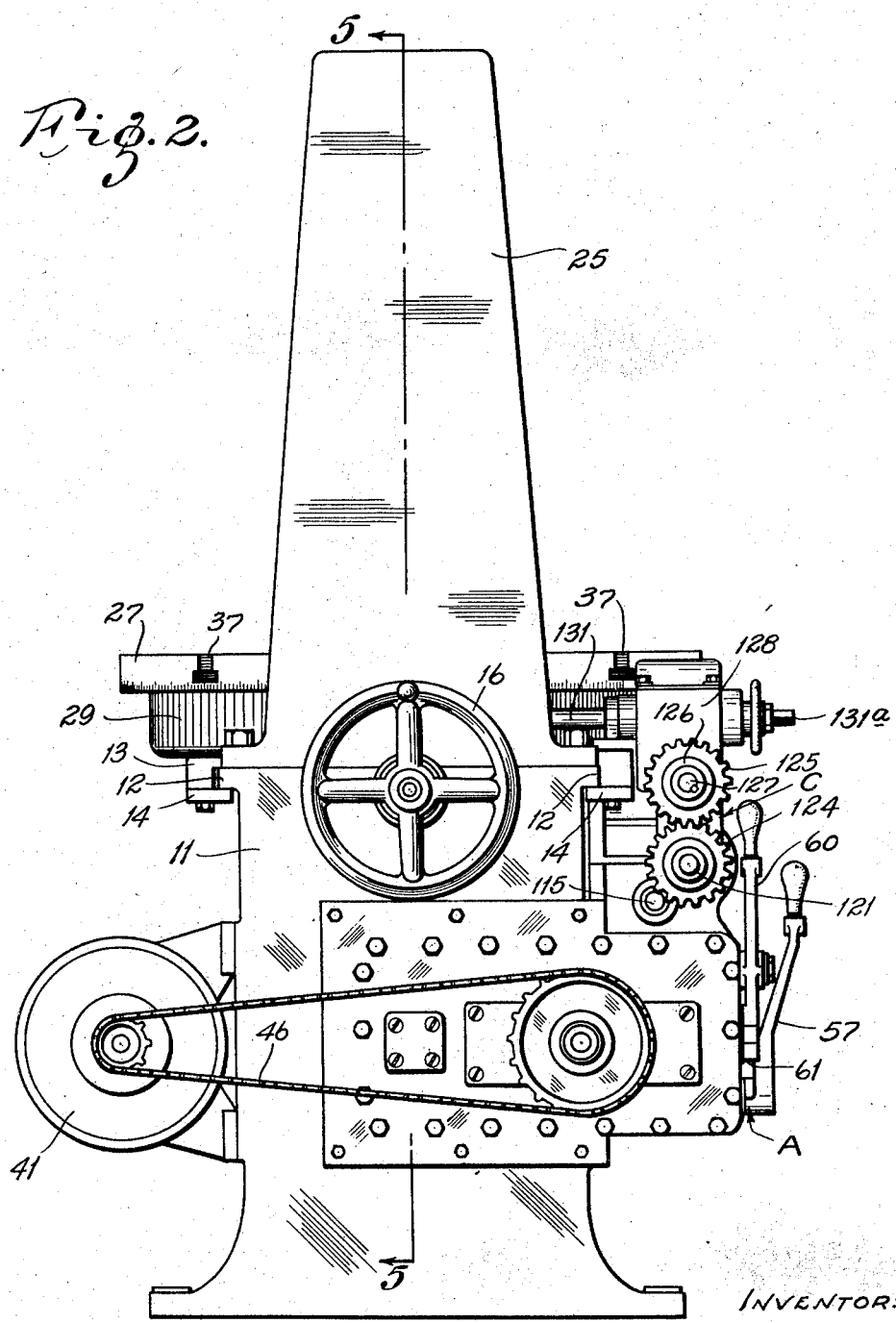

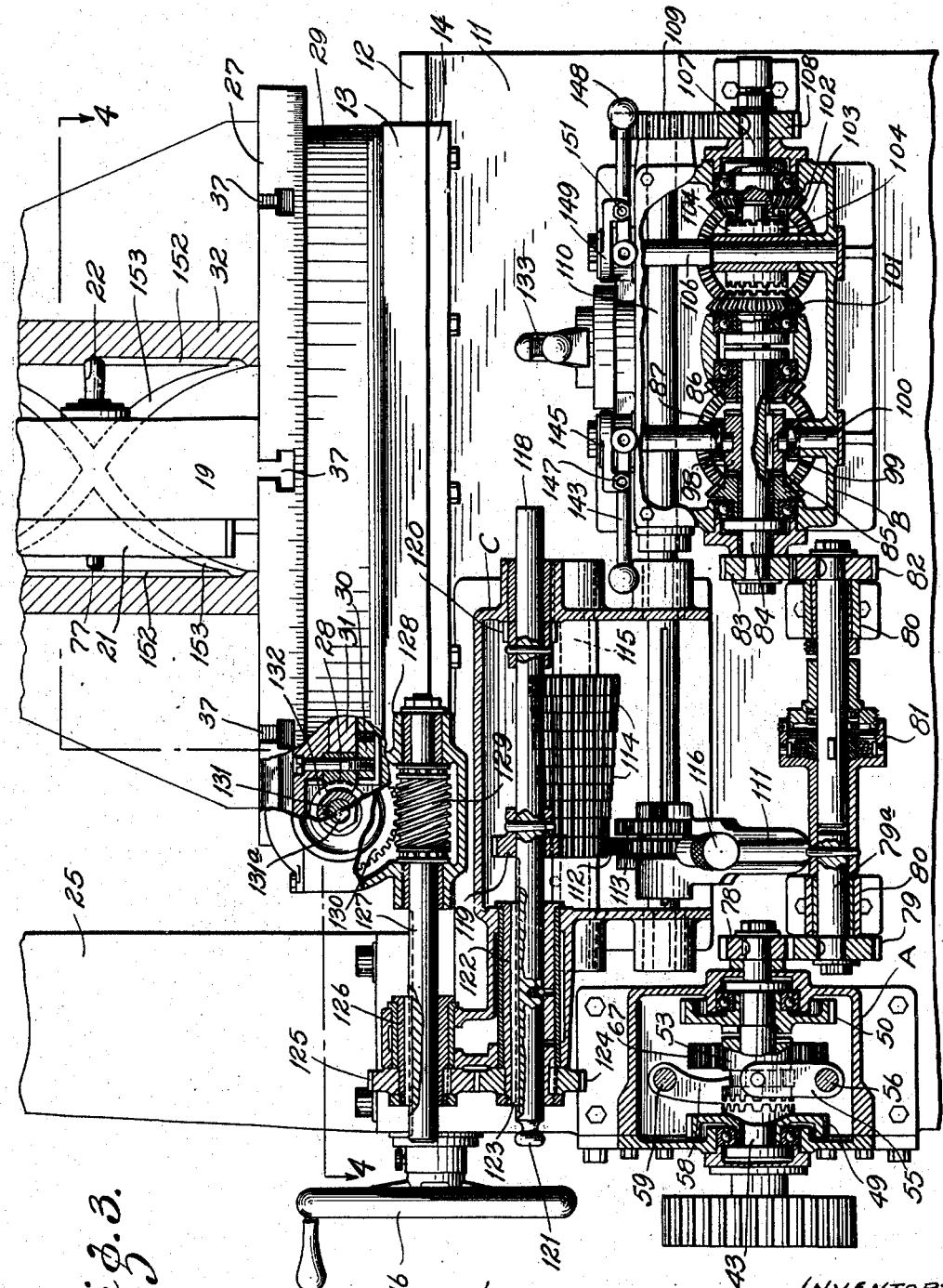

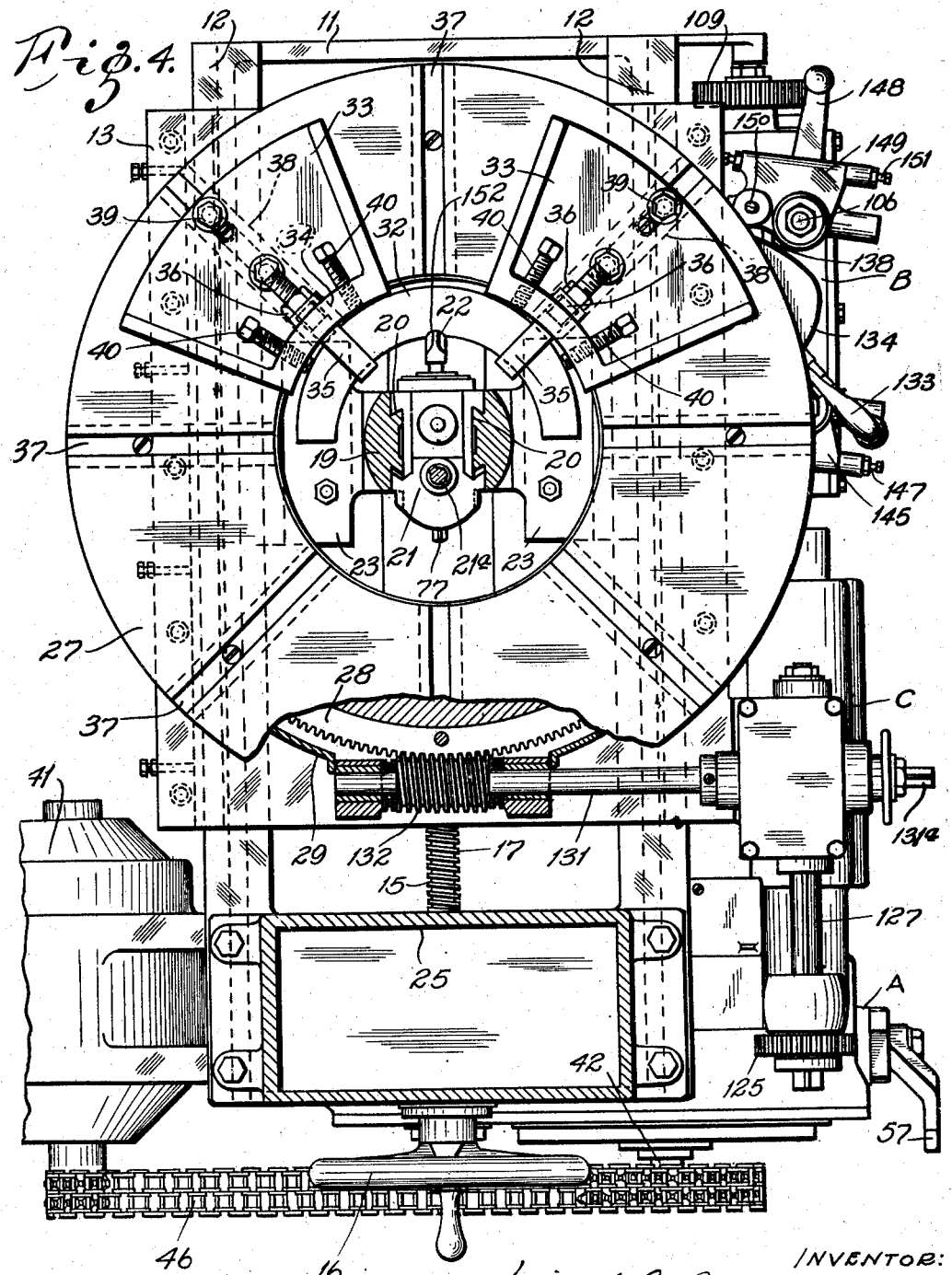

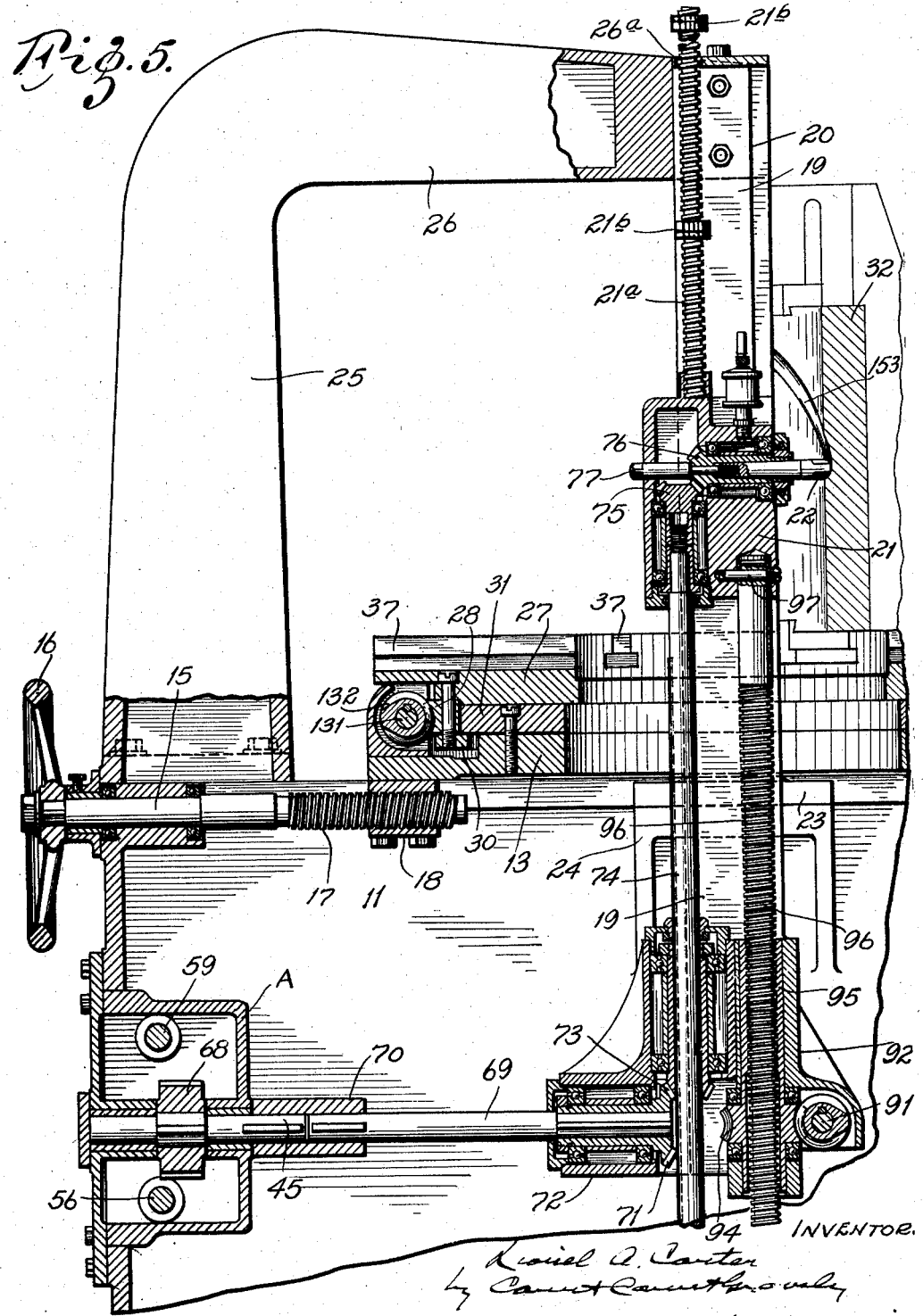

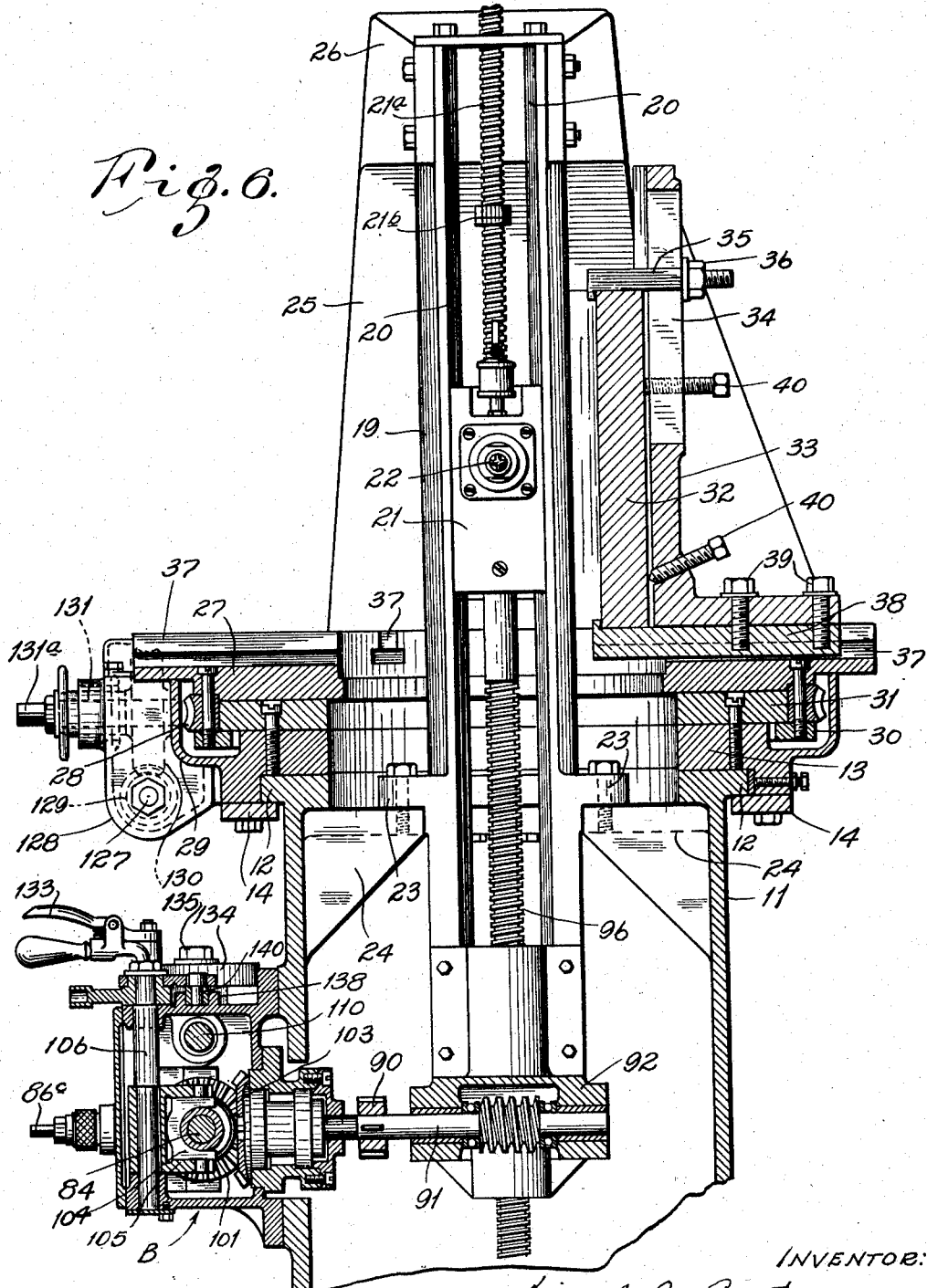

Patented Jan. 21, 1930

1,744,362

UNITED STATES PATENT OFFICE

LIONEL A. CARTER, OF WEBSTER GROVES, MISSOURI, ASSIGNOR TO LEHMANN MACHINE COMPANY, OF ST. LOUIS, MISSOURI, A CORPORATION OF MISSOURI

MILLING MACHINE

Application filed March 21, 1928. Serial No. 263,391.

This invention relates to milling machines particularly adapted for use in cutting oil distributing grooves in journal bearings for railway axles. It has for its principal objects to produce a milling machine which will quickly, easily and accurately cut circular, longitudinal, right and left-hand helical oil grooves in the concave journal engaging surface of the journal bearing. Other objects are to provide means for correctly positioning the bearing on the table of the machine, means for setting the machine to cut longitudinal grooves of different lengths and helical grooves of different angles, and means for controlling the cutting of said grooves by means of a single operating lever. Another object is to provide means for preventing feed of the cutter when the cutter is not running, and to obtain other advantages hereinafter appearing.

The invention consists in the milling machine and in the construction, combinations and arrangements of parts hereinafter described and claimed.

In the accompanying drawings, which form part of this specification and wherein like symbols refer to like parts wherever they occur, Fig. 1 is a front elevation of a milling machine embodying my invention, Fig. 2 is an end elevation thereof, Fig. 3 is a front view of the lower portion of the machine, the gear boxes containing the drive gearing therefor being shown in vertical section, Fig. 4 is a horizontal cross-section on the line 4—4 in Fig. 3, Fig. 5 is a vertical cross-section through the machine on the line 5—5 in Fig. 2, Fig. 6 is a vertical central longitudinal section through the machine on the line 6—6 in Fig. 1, Fig. 7 is a horizontal cross-section on the line 7—7 in Fig. 1, Fig. 8 is a plan view of the feed controlling gear box and the cam lever at the top thereof which controls the starting, stopping and the direction of both vertical and circular feeds, Fig. 9 is a horizontal sectional view of the cam which controls the sequence of operation of the machine, and Fig. 10 is a front elevation of the starting gear box and the levers thereon which control the feed and speed of the cutter.

The milling machine shown in the accompanying drawings comprises a bed 11 open at its top and provided along its upper side edges with longitudinal slideways 12, upon which is supported a carriage 13. The carriage is held down on the slideways 12 of the bed by means of plates 14 that are bolted or otherwise removably secured to the bottom face of the carriage near each side edge thereof with their inner side edges extending beneath the overhanging outer side edges of the slideways. The carriage 13 is slid longitudinally of the bed by means of a horizontal shaft 15, which is journaled in a bearing provided therefor at one end of the bed and is provided at its outer end with a hand wheel 16, and at its inner end with a threaded portion 17 which engages a threaded bore in a bracket 18 fixed to the adjacent end of said carriage. As shown in the drawings, the carriage 13 has a large circular opening extending vertically therethrough adapted to accommodate a column 19 provided with vertical slideways 20 in which is slidably supported a cutter head 21 carrying a horizontally disposed rotary cutting tool in the form of an end mill 22. The central vertical column 19 which supports the vertically slidable cutter head 21, is provided with laterally projecting lugs 23, which rest on and are bolted to supporting lugs 24 which project inwardly from the opposite side walls of the bed of the machine. Additional rigidity is imparted to the cutter head column 19 by means of a main column 25 which is bolted to the rear portion of the bed, and has an overhead arm 26 whose outer end is positioned at the top of the cutter head column. Fixed to the top of the cutter head 21 is an upright screw $21^a$, whose upper end passes loosely through a hole $26^a$ in the outer end of the arm 26 of the main column 25. The screw $21^a$ is provided above and below the opening $26^a$ with nuts $21^b$, which serve as adjustable stops for limiting the movement of the cutter head in both directions of its sliding movement.

Mounted on the upper surface of the longitudinal slidable carriage 13 for rotation on a vertical axis, is an annular work supporting table 27 having a worm gear 28 formed in its peripheral edge. As shown in the drawings, the carriage 13 is provided with a circular upstanding flange 29 which surrounds the worm gear of the table and forms a lubricant chamber for supplying oil to said worm gear. The annular work supporting table surrounds the cutter head column 19 and is held down on the carriage 13 by means of a retaining ring 30 which is secured to the lower edge of said table and projects beneath the outer edge of an annular plate 31 screwed to the carriage.

The brass or journal 32, in which it is desired to cut the oil distributing grooves, is placed in an upright position on the table 27, with its concave journal engaging portion facing the cutting end of the end mill 22, and is rigidly secured in the desired position on the table by means of a pair of brackets 33. Each of these brackets comprises a horizontal base portion, which rests on the upper surface of the table, and an upstanding portion provided with a vertical slot 34 adapted to accommodate a horizontally disposed clamping bar 35, which extends across the upper end of the journal bearing and has a depending hook portion adapted to hook over the upper inner corner of the bearing. The outer end of the clamping bar 35 is threaded to receive a nut 36, which prevents inward sliding movement of the bar. The upper surface of the table 27 is provided with a series of radially extending T-slots 37 adapted to slidably support bottom clamping bars 38 of T-shaped section having an upstanding hook at its inner end adapted to engage the inner lower corner of the bearing. As shown in the drawings, each of the brackets 33 is arranged with its base portion over one of the radial T-slots 37 and is secured to the clamping bar 38 therein by cap screws 39, which also serve to clamp said clamping bar in said slot and thus prevent movement of the supporting bracket on the table. The bearing is forced against the hooked inner ends of the top and bottom clamping bars 35 and 38, respectively, by means of set screws 40 that are threaded through the upstanding portion of the supporting bracket and bear against the outer surface of said bearing.

The mechanism for rotating the table 27 and the end mill 22, and for actuating the vertically slidable cutter head 21 comprises an electric motor 41 attached to the rear side of the bed of the machine near one end thereof, and three groups of gears contained in gear housings A, B and C, respectively, bolted to said bed. The gear box A is bolted to the end of the bed adjacent to the motor 41 and contains four horizontally disposed parallel shafts 42, 43, 44 and 45, respectively, which extend longitudinally of the bed from side wall to side wall of the gear box A with their ends rotatably supported in bearings therein. As shown in the drawings, the main drive shaft 42 is driven from the motor 41 by means of a sprocket chain 46, and has two gears 47 and 48 fixed thereto which mesh with a pair of gears 49 and 50 journaled on the shaft 43 and a pair of gears 51 and 52 journaled on the shaft 44. The two gears on each of the shafts 42, 43 and 44 are of different diameter, the large gear 47 on the main shaft 42 meshing with the small gears 49 and 51 on the counter shafts 43 and 44, and the small gear 48 on said main shaft 42 meshing with the large gears 50 and 52 on said counter shafts. Splined on the counter shafts 43 and 44, between the pairs of gears journaled thereon, are clutches 53 and 54, respectively, that are provided at their opposite ends with clutch teeth adapted to be engaged with clutch teeth on the opposing faces of said pair of gears, where one or the other gears of each pair may be coupled to its counter shaft to drive the same at either of two speeds.

The clutch member 53 on the counter shaft 43 is slid longitudinally of the shaft to engage one or the other of the gears 49 and 50 thereon by means of a clutch shifter arm 55 fixed to a horizontal rock-shaft 56, which is located below said counter shaft and extends transversely thereof from end to end of the gear box A with its ends rotatably supported in the end walls thereof. The front end of the rock-shaft 56 projects beyond the front face of the gear box A and is provided with an operating lever 57. The clutch member 54 which engages the two gears 51 and 52 on the counter shaft 44 is shifted longitudinally thereof into engagement with one or the other of said gears by means of a shifter arm 58 fixed to a horizontal rock-shaft 59 located above said counter shaft and extending transversely thereof from end to end of the gear box A with its ends rotatably supported in the end walls of said gear box. The rock-shaft 59 is also provided at its outer end with an operating lever 60 located between the lower lever 57 and said end of said gear box. Fixed to the front face of the gear box A is a bracket 61 having a horizontally disposed forwardly projecting plate portion 62 which extends beneath the lower end of the upper lever 60 and has a vertically slidable plunger pin 63 mounted in a recess thereon. The pin is forced upwardly by means of a spring 64 sleeved therein between the head thereof and the shoulder formed by the rounded lower end of the pin; the head of the pin being adapted to seat in either of two recesses 65 in the lower end of the upper lever 57 when the lever is shifted to engage the clutch 54 with either of the gears 51 and 52 on the counter shaft 44 and the rounded lower end of said pin being forced downwardly into the recess 66 in the lower lever in the neutral position thereof. By this arrangement, the lower lever 57, which controls the sliding movement of the cutter head 21 and the rotation of the table 27, is locked in neutral position when the upper lever 60, which controls the rotation of the cutter 22, is in neutral position, thereby rendering it impossible to rotate the table or move the cutter head before the cutter has started to rotate.

The clutch 54 on the counter shaft 44 has a gear 67 formed integral therewith which meshes with a gear 68 fixed to the shaft 45. The inner end of the shaft 45 projects through the inner side of the gear box A and is slidably connected with one end of another shaft 69 disposed in axial alinement therewith by means of a coupling sleeve 70. The other end of the cutter drive shaft section 69 is keyed to the hub of a bevel gear 71, which is rotatably supported in bearings in a housing 72 bolted to the lower end portion of the cutter head column 19 and meshes with a bevel gear 73 having a hub portion journaled in bearings provided therefor, in said housing.

The hub portion of the bevel gear 73 is splined on a vertically disposed shaft 74, which extends upwardly through the central openings in the carriage 13 and the table 27 and has the hub of a bevel gear 75 fixed to the upper end thereof. The hub portion of the bevel gear 75 is journaled in bearings in the vertically slidable cutter head 21; and said bevel gear meshes with a bevel gear 76 having a hub portion journaled in bearings in said cutter head for rotation on a horizontal axis. The hub of the bevel gear 76 is provided with a tapered bore adapted to receive the tapered shank portion of the mill 22, which is held in the hub of said gear by means of a screw 77.

The inner end of the counter shaft 43 terminates beyond the inner wall of the gear box A and has a gear 78 keyed thereon which meshes with a gear 79 keyed to the adjacent end of a split connecting shaft 79ª, which extends longitudinally of the bed 11 and is supported in bearings 80 bolted to the front face thereof. The two sections of the shaft 79ª are connected by means of a suitable multiple disk friction clutch 81, which serves as a safety device by slipping when the stop nuts 21ᵇ strike the arm 26 of the main column and thus prevent further sliding movement of the cutter head 21. Keyed to the connecting shaft 79ª is a gear 82, which meshes with a gear 83 fixed to one end of a horizontally disposed drive shaft 84 journaled in the gear box B bolted to the front wall of the bed of the machine. Two separate drives are taken from the drive shaft 84 in the gear box B, one for the vertical feed of the cutter head 21, and the other for the circular feed of the work table 27. The cutter head feed is taken off the drive shaft at right angles thereto through three bevel gears, 85, 86 and 87, respectively. The bevel gears 85 and 86 are rotatably mounted on the drive shaft 84 and have clutch teeth formed in the opposing faces; and the third bevel gear 87 is in continuous mesh with the two gears 85 and 86 and is journaled for rotation on a horizontal axis in the rear wall of the gear box B. The bevel gear 87 is keyed on the end of a short shaft 88 whose opposite end has a gear 89 fixed thereon which meshes with a gear 90 fixed to a horizontal worm shaft 91 journaled in a suitable housing 92 secured to the lower end of the cutter head column 19. Fixed to the worm shaft is a worm 93, which meshes with a worm gear 94 formed on a nut 95 journaled for rotation on the vertical axis of the housing 92 and held against axial movement therein by means of suitable end thrust bearings. The nut 95 having the worm gear 94 thereon cooperates with a vertically disposed screw 96 whose upper end is secured to the vertically slidable cutter head 21 by means of a pin 97 which prevents rotation of said screw. Splined on the drive shaft 84 between the two bevel gears 85 and 86 is a clutch 98 which is provided at its opposite ends with clutch teeth adapted to cooperate with clutch teeth formed in opposite faces of said bevel gears 85 and 86. The clutch 98 is slid into engagement with one or the other of the two bevel gears 85 and 86 to obtain forward or reverse feed for the cutter head by means of a rock arm 99 fixed to a vertically disposed rock shaft 100, rotatably supported in bearings provided therefor in the top and bottom walls of the gear box B. Journaled in the front wall of the gear box B is a short horizontal shaft 86ª provided at its inner end with a small bevel gear 86ᵇ, which meshes with the bevel gear 86, and is provided at its outer end with a squared portion 86ᶜ adapted to receive a socket tool or handle whereby the cutter head may be reciprocated independently of the drive gearing therefor.

The table drive is taken off the drive shaft 84 of the gear box B through three bevel gears 101, 102 and 103, respectively. The bevel gears 101 and 102 are loose on the drive shaft 84 and have clutch teeth formed in their opposing faces; and the third bevel gear 103 is an idler gear which is provided in the rear wall of the gear box and meshes continuously with the two gears 101 and 102. A clutch member 104 is also splined on the drive shaft 84 and is provided at its ends with clutch teeth adapted to cooperate with clutch teeth formed on the opposing end faces of the two bevel gears 101 and 102 to secure a forward or reverse rotation of the gear 102. The clutch 104 is slid into engagement with either of the two bevel gears 101 and 102, by means of a rock arm 105 secured to a vertical rock shaft 106 whose upper and lower ends are journaled in the top and bottom walls of the gear box B. The bevel gear 102 is secured to one end of a short shaft 107, which extends beyond the end of the gear box B and is provided with a gear 108 which meshes with a gear 109 on the end of a horizontally disposed drive shaft 110 located thereabove.

The drive shaft 110 extends through the gear box B and through a change speed gear box C bolted to the front face of the bed of the machine. This change speed gearing which is shown and described in detail in my Patent No. 1,296,161, dated March 4, 1919, comprises a rocker arm 111 slidably and pivotally mounted on the drive shaft 110 between the end walls of the change speed gear box C and has a yoke portion which embraces two trains of gears 112 and 113, either one of which may be caused to engage with any one of a series of ten gears 114 keyed on a shaft 115, which is located above the shaft 110 and is disposed parallel to said shaft with its ends rotatably supported in the ends of the change speed gear box. The gears 114 are of different size, adjacent gears varying in size by one or two teeth from each other, the series of gears forming a stepped cone. By shifting the rocker arm 111 along the shaft 110 and swinging the handle thereof, the gear trains 112 and 113 may be engaged with any one of the cone gears 114. The handle of the rocker arm 111 may be secured in any said position to hold the gear trains in proper mesh by means of a spring pressed pin 116, the end of which is adapted to engage in one of a series of holes 117 in the quick change gear box C. The holes 117 are arranged in two rows, one above the other, marked 1 to 10 and 11 to 20, respectively, corresponding to the twenty changes which may be obtained in the speed of the shaft 115 by driving one or the other of the ten gears through one or the other of the two trains of gears carried by the rocker arm.

Extending parallel to the axis of the cone gears 114 is a shaft 118, which is slidably and rotatably mounted in the quick change gear box C. The shaft 118 has two gears 119 and 120 of different diameters keyed thereon; and one end of the shaft projects beyond the quick change gear box and is provided with a knob 121, whereby the shaft may be slid in the direction of its length to bring the large gear 119 thereon into mesh with the smallest cone gear, or to bring the small gear 120 on said shaft into mesh with the largest cone gear. By this arrangement the twenty changes obtained in the speed of the shaft 115 by the cone gears and rocker arm is increased to forty changes in the speed of the shaft 118.

The longitudinally slidable shaft 118 extends through a sleeve 122 which is rotatably supported in the quick change gear box C and is connected to the said shaft for rotation therewith by means of a spline 123. This rotary sleeve 122 is held against endwise movement in the quick change gear box C and has a gear 124 fixed to its outer end which meshes with a gear 125 fixed to a sleeve 126 journaled for rotation on an axis parallel to the axis of the longitudinally slidable shaft 118 within an upstanding bearing provided therefor at the end of the quick change gear box. One end of a worm shaft 127 projects through the sleeve 126 and is splined thereto, and the other end is journaled in the carriage 13, whereby said shaft is driven by said sleeve and, at the same time, is longitudinally slidable therein when the carriage is slid along the bed 11. The carriage end of the worm shaft 127 is journaled in bearings provided therefor in the opposite walls of a housing 128 mounted on and movable with the carriage 13 and is provided with a worm 129 which meshes with a worm gear 130 fixed to a horizontal shaft 131 journaled on the carriage and extending crosswise thereof. The worm gear shaft 131 is also provided with a worm 132 which meshes with the worm gear 28 on the periphery of the work supporting table 27 and thus serves to drive the same. The outer end of the shaft 131 projects beyond the housing 128 and is squared, as at 131$^a$, to receive a socket wrench or handle, whereby the table can be rotated independently of the drive gearing therefor.

The two clutches 98 and 104 in the gear box B are connected together so that the starting and stopping and also the direction of movement of the cutter head 21 and the table 27 are controlled by the manipulation of a single control lever 133 located on top of said box in easy reach of the operator. This control lever 133 has an enlarged hub portion 134 which is pivotally secured to the top of the control box by a vertical pivot 135. The underside of the hub portion 134 of the control lever 133 is provided on its bottom face with two downwardly opening cam grooves 136 and 137 located one on each side of the control lever pivot 135. Mounted in a horizontal slideway 138 provided therefor on top of the gear box B are two slide blocks 139 and 140, respectively, the block 139 having an upstanding pin 141 thereon which cooperates with the cam groove 136, and the block 140 having an upstanding pin 142 which cooperates with the other cam groove 137. Fixed to the upper end of the rock shaft 100, which actuates the clutch 98 for the cutter head feed, is an operating handle 143; and journaled on said shaft 100 above the handle 143 is a block 145 having a slot-and-pin connection 146 with the slide block 139 that cooperates with the cam groove 136 in the control lever 133. The rotary block 145 carries two spring plungers 147 which bear against the opposite sides of the handle 143. The upper end of the rock shaft 106, which actuates the clutch 104 for the table feed, is also provided with an operating handle 148, a rotary block 149, having a slot-and-pin connection 150 with the slide block 140 that cooperates with the cam groove 137 in the control lever 133, and two spring plungers 151 bearing against the opposite sides of the handle 148. With this arrangement, swinging movement of the control lever 133 causes the rotary blocks 145 and 150 to rotate on the rock shafts 100 and 106, respectively, and swing the operating handles 143—148 thereon through the medium of the spring plungers and thus throw in or out the cutter head feed and table drive. It is noted, that the spring connection between the rotary blocks and the handles fixed to the clutch operating shafts permits said handles to be operated independently of the main control handle 133; and they also permit the clutches controlled thereby to yield slightly until the teeth thereof are properly meshed with the clutch teeth on the gears.

A desirable arrangement of the oil distributing grooves for journal bearings comprises two parallel grooves 152 extending parallel to the axis of the bearing and connected by two intersecting right and left hand helical grooves 153 connecting one end of each straight groove with the opposite end of the other straight groove; and the cam grooves 136 and 137 in the hub of the control lever 133 have been designed to enable the present machine to cut the above grooves with but four movements of the control lever 133.

The operation of the machine is as follows: The journal bearing 32 is placed on the table 27 in upright position with its grooved journal engaging surface facing the cutting edge of the vertically moveable end mill 22 and is then clamped in proper position on the table by means of brackets 33. The upper and lower stop nuts 26ª on the upright screw 21ª carried by the cutter head 21 are then adjusted to limit the vertical sliding movement of the cutter head to a distance corresponding to the length desired for the two parallel grooves 151 that are to be cut in the journal bearing. The table is then manually rotated by means of the worm gear shaft 131 to bring the work in proper position with reference to the end cutter; and the cutter head is then adjusted by means of the shaft 86ª to bring the cutter to a proper elevation. The operator then sets the quick change gear box C by means of the rock arm 111 and axially moveable shaft 118 to obtain a table speed which will cause the table to rotate a distance corresponding to the distance between the two straight grooves 151 while the end mill moves vertically a distance corresponding to the length of the straight grooves. The lever 60 on the gear box A is then shifted to throw in one or the other of the two rotary speeds for the end mill, after which the lever 57 on said gear box is shifted to one or the other of its two feed positions to drive the gearing in the gear box B. As stated above, the mounting of the levers 57 and 60 on the gear box A is such that the lever 57 which supplies the feed for the gear box B cannot be thrown in until after the lever 60 is operated to throw in the rotary cutter drive. It is also noted that with the lever 57 in either of its two feed positions no movement is imparted to the table 27 or cutter head 21 until the control lever 133 is operated to throw in the clutches 98 and 104 in the control box B. After the levers 57 and 60 of the starting box A have been operated to throw in the rotary cutter drive and the feed for the control box B, and the gears in the quick change gear box C have been adjusted to obtain the desired table speed, the carriage 13, which supports the rotary table 27, is shifted longitudinally of the bed 11 by means of the hand wheel 16 to move the journal bearing 32 into engagement with the cutting end of the rotating end mill 22. After correctly positioning the journal bearing on the table and setting the machine to cut straight grooves of the desired length and helical grooves of the desired length and angle, the two straight grooves and the two intersecting helical grooves are cut in the journal bearing by but four movements of the control lever 133. With the cams 136 and 137 shaped as shown in the drawings, when the control lever 133 is moved to a central position, it causes the end mill 22 to move upwardly with the cutter head 21 and thus cut one of the vertical grooves. When the control lever is moved to the left it causes the end cutter to move downwardly and the table to rotate to the left, thus causing the end mill to cut the left hand helical groove. When the control lever is again moved to the center it causes the end mill to again move upwardly and no movement is imparted to the table, thereby causing the second vertical groove to be cut. When the control lever is shifted to the left it causes the end mill to again move downwardly and, at the same time, also causes the table to rotate to the right, thereby causing a right hand helical groove to be cut in the journal bearing. The stops 21ᵇ, which were set before the operation for the length of slot desired, abut against the overhead arm 26 of the main column 25 during the upward and downward sliding movement of the cutter head, thereby preventing further sliding movement of the cutter head and relieving the operator of the necessity for operating the control lever at precisely the right time to throw out the clutches in the control box B.

The change speed gearing, when properly set according to the length of straight groove desired, will give the table a speed which will properly connect the adjacent ends of the helical and straight grooves. The cams in the hub of the control lever 133 are designed to provide neutral positions between all feed positions of said lever.

Obviously, the machine hereinbefore described admits of considerable modification without departing from the invention, as simple gear changes may be made to adapt the machine to cut other forms of grooves, and the machine will readily lend itself to any particular requirements.

What I claim is:

1. A milling machine comprising a slidable and rotatably supported work table, a cutter head slidable in directions parallel to the rotary axis of said table, a rotary end cutter journaled in said cutter head, means for rotating said table and said cutter in all positions of their sliding movement, and means for reciprocating said cutter head independently of or simultaneously with the rotation of said work table.

2. A milling machine comprising a bed, a carriage on said bed, a work table rotatably supported on said carriage, means for rotating said table in either direction in all positions of the sliding movement of said carriage, a cutter head slidable in directions parallel to the rotary axis of said table, a rotary end cutter journaled in said cutter head, means for rotating said cutter and said table in all positions of the sliding movement of said cutter head, means for reciprocating said cutter head independently of or simultaneously with the rotation of said work table, and adjustable means for limiting the sliding movement of said cutter head in both directions of its sliding movement.

3. A milling machine comprising a bed, a carriage on said bed, a work table rotatably supported on said carriage, means for rotating said table in all positions of the sliding movement of said carriage, a cutter head slidable in directions parallel to the rotary axis of said table, a rotary end cutter journaled in said cutter head, means for rotating said cutter in all positions of the sliding movement of said cutter head, means for securing independent or simultaneous operation of said cutter head and said table in either direction of their movement, and adjustable means for limiting the sliding movement of said cutter head and the rotary movement of said table.

4. A milling machine comprising a bed, a carriage on said bed, a work table rotatably supported on said carriage, means for rotating said table at different selected speeds in all positions of the sliding movement of said carriage, a cutter head slidable in directions parallel to the rotary axis of said table, a rotary end cutter journaled in said cutter head, means for actuating said cutter head and for rotating said cutter and said table in all positions of the sliding movement of said cutter head and said carriage, and a single control means for independently or simultaneously operating said cutter head and said table operating means.

5. A milling machine comprising a bed, a carriage on said bed, a table rotatably supported on said carriage, means for rotating said table in all positions of the sliding movement of said carriage, a cutter head slidable in directions parallel to the rotary axis of said table, a rotary end cutter journaled in said cutter head, means for rotating said cutter in all positions of the sliding movement of said cutter head, and a single control means for said cutter and said table operating means, said control means being arranged to secure independent or simultaneous operation of said cutter head and said rotary table.

6. A milling machine comprising a bed, a carriage on said bed, a table rotatably supported on said carriage, means for rotating said table in all positions of the sliding movement of said carriage, a cutter head slidable in directions parallel to the rotary axis of said table, a rotary end cutter journaled in said cutter head, means for rotating said cutter in all positions of the sliding movement of said cutter head, a single control means for said cutter and said table operating means, said control means being arranged to reciprocate said cutter head independently of or simultaneously with the rotation of said rotary table, and means for varying the speed of the table.

7. A milling machine comprising a bed, a carriage on said bed, a table rotatably supported on said carriage, a cutter head slidable in directions parallel to the rotary axis of said table, a rotary end cutter journaled in said cutter head, gearing for actuating said cutter head and for rotating said cutter and said table in all positions of the sliding movement of said cutter head and said carriage, clutches operating with said gearing for changing the direction of rotation of said table and the sliding movement of said cutter, and a single control lever operatively connected with said clutches for independently or simultaneously operating said table and said cutter head in either direction of their movement.

8. A milling machine comprising a bed, a carriage on said bed, a table rotatably supported on said carriage, a cutter head slidable in a direction parallel to the rotary axis of said table, a rotary end cutter journaled in said cutter head, clutch controlled gearing for actuating said cutter head and for rotating said cutter and said table in all positions of the sliding movement of said cutter head and said carriage, and means cooperating with said clutch for operating the same to rotate the cutter and feed the cutter head, said clutch operating means preventing the cutter head feed from being thrown in before the cutter is rotated.

9. A milling machine comprising a bed, a carriage on said bed, a table rotatably supported on said carriage, a cutter head slidable in directions parallel to the rotary axis of said table, a rotary end cutter journaled in said cutter head, means for operating said table, said cutter and said cutter head at either of two speeds, and means for preventing operation of the table and cutter head until the cutter is operated.

10. A milling machine comprising a bed, a carriage on said bed, a table rotatably supported on said carriage, a cutter head slidable in directions parallel to the rotary axis of said table, a rotary end cutter journaled in said cutter head, clutch controlled gearing for operating said table, said cutter head and said cutter at either of two speeds, clutch operating levers for actuating the clutch of said gearing, and means cooperating with said levers for locking in neutral position the lever which controls the table drive and cutter head feed when the lever which controls the cutter drive is in neutral position.

11. A milling machine comprising a bed, a carriage on said bed, a table rotatably supported on said carriage, a cutter head slidable in directions parallel to the rotary axis of said table, a rotary end cutter journaled in said cutter head, clutch controlled gearing for operating said table, said cutter head and said cutter at either of two speeds, clutch operating levers for actuating the clutch of said gearing, and means cooperating with said levers for locking in neutral position the lever which controls the table drive and cutter head feed when the lever which controls the cutter drive is in neutral position, said locking means being releasable by the movement to operative position of the lever which controls the cutter drive.

12. A milling machine comprising a bed, a carriage on said bed, a table rotatably supported on said carriage, a cutter head slidable in either direction parallel to the rotary axis of said table, a cutter rotatable in said head, clutch controlled gearing for rotating said table in either direction of its rotary movement and for moving said cutter head in either direction of the sliding movement, said gearing including a clutch for controlling the movement of the table in either direction and a clutch for controlling the movement of the cutter head in either direction, and a single control means cooperating with each of said clutches, whereby said clutches may be independently or simultaneously actuated by the control lever.

13. A milling machine comprising a bed, a carriage on said bed, a table rotatably supported on said carriage, a cutter head slidable in either direction parallel to the rotary axis of said table, a cutter rotatable in said head, clutch controlled gearing for rotating said table in either direction of its rotary movement and for moving said cutter head in either direction of the sliding movement, said gearing including a clutch for controlling the movement of the table in either direction and a clutch for controlling the movement of the cutter head in either direction, and a single control lever having a cam cooperating with each of said clutches, whereby said clutches may be independently or simultaneously actuated by the control lever.

14. A milling machine comprising a bed, a carriage on said bed, a table rotatably supported on said carriage, a cutter head slidable in either direction parallel to the rotary axis of said table, a cutter rotatable in said head, clutch controlled gearing for rotating said table in either direction of its rotary movement and for moving said cutter head in either direction of the sliding movement, said gearing including a clutch for controlling the movement of the table in either direction and a clutch for controlling the movement of the cutter head in either direction, a single control lever having a cam cooperating with each of said clutches, whereby said clutches may be independently or simultaneously actuated by the control lever, and separate levers for actuating said clutches independently of said control lever.

15. A milling machine comprising a bed, a carriage on said bed, a table rotatably supported on said carriage, a cutter head slidable in either direction parallel to the rotary axis of said table, a rotary cutter journaled in said cutter head, clutch controlled gearing for rotating said cutter, for rotating said table in either direction of its rotary movement and for moving said cutter head in either direction of the sliding movement, said gearing including a clutch for controlling the movement of the table in either direction and a clutch for controlling the movement of cutter head in either direction, a rock-shaft for each clutch, a shifter arm on said rock-shaft and cooperating with said clutch, a block rotatably mounted on each rock-shaft, an arm fixed to each rock-shaft adjacent to the block thereon, yieldable connections between said rotary blocks and said arms, a pair of slide blocks arranged for sliding movement transversely of said rock-shafts, and having slot-and-pin connections with said rotary blocks thereon, a control lever journaled on a pivot located between said blocks for swinging movement transversely of said shafts, and having cam grooves therein, and pins on said blocks cooperating with said cam grooves.

16 A milling machine comprising a bed, a carriage on said bed, a table rotatably supported on said carriage, a cutter head slidable in either direction parallel to the rotary axis of said table, a rotary cutter journaled in said cutter head, clutch controlled gearing for rotating said cutter, for rotating said table in either direction of its rotary movement and for moving said cutter head in either direction of the sliding movement, said gearing including a clutch for controlling the movement of the table in either direction and a clutch for controlling the movement of cutter head in either direction, a rock-shaft for each clutch, a shifter arm on said rock-shaft and cooperating with said clutch, a block rotatably mounted on each rock-shaft, an arm fixed to each rock-shaft adjacent to the block thereon, yieldable connections between said rotary blocks and said arms, a pair of slide blocks arranged for sliding movement transversely of said rock-shafts, and having slot-and-pin connections with said rotary blocks thereon, a control lever journaled on a pivot located between said blocks for swinging movement transversely of said shafts, and having cam grooves therein, and pins on said blocks cooperating with said cam grooves, said cam grooves being shaped to secure independent or simultaneous operation of the clutches in the different angular positions of the control lever.

17. A milling machine comprising a bed, a carriage on said bed, a table rotatably supported on said carriage, a cutter head slidable in either direction parallel to the rotary axis of said table, a rotary cutter journaled in said head, clutch controlled gearing for rotating said cutter, for rotating said table in either direction of its rotary movement and for moving said cutter head in either direction of the sliding movement, said gearing including a clutch for controlling the movement of the table in either direction and a clutch for controlling the movement of the cutter head in either direction, a single control means cooperating with each of said clutches, whereby said table and said cutter head may be independently or simultaneously actuated by the control lever, said gearing including a change speed mechanism for obtaining different table speeds.

18. A machine for cutting oil grooves in journal bearings, comprising a bed, a carriage on said bed, a table rotatably supported on said carriage, and adapted to support the journal bearing, means for rotating said table in all positions of the sliding movement of said carriage, a cutter head slidable in directions parallel to the rotary axes of said table and said bearing, a rotary end cutter journaled in said cutter head, means for rotating said cutter in all positions of the sliding movement of said cutter head, a single control means for said cutter head and said table operating means, said control means being arranged to secure independent operation of said cutter head and the table to cut straight and circular grooves, respectively, and to secure simultaneous operation of said cutter head and said table to cut helical grooves.

19. A machine for cutting oil grooves in journal bearings, comprising a bed, a carriage on said bed, a table rotatably supported on said carriage, and adapted to support the journal bearing, means for rotating said table in all positions of the sliding movement of said carriage, a cutter head slidable in directions parallel to the rotary axes of said table and said bearing, a rotary end cutter journaled in said cutter head, means for rotating said cutter in all positions of the sliding movement of said cutter head, a single control means for said cutter head and said table operating means, said control means being arranged to secure independent operation of said cutter head and the table to cut straight and circular grooves, respectively, and to secure simultaneous operation of said cutter head and said table to cut helical grooves, and means for changing the speed of the table to cut helical grooves of different angles.

Signed at St. Louis, Missouri, this 19th day of March, 1928.

LIONEL A. CARTER.